(12) United States Patent
Kai et al.

(10) Patent No.: US 10,794,298 B2
(45) Date of Patent: Oct. 6, 2020

(54) ENGINE

(71) Applicant: KUBOTA Corporation, Osaka-shi, Osaka (JP)

(72) Inventors: Akihiko Kai, Sakai (JP); Katsushi Inoue, Sakai (JP); Masahiko Sugimoto, Sakai (JP); Kentaro Kita, Sakai (JP); Hideo Shimoji, Sakai (JP); Hiroki Murata, Sakai (JP); Gen Nakamura, Sakai (JP)

(73) Assignee: KUBOTA Corporation, Osaka-Shi, Osaka (JP)

( * ) Notice: Subject to any disclaimer, the term of this patent is extended or adjusted under 35 U.S.C. 154(b) by 0 days.

(21) Appl. No.: 16/212,794

(22) Filed: Dec. 7, 2018

(65) Prior Publication Data
US 2019/0186384 A1 Jun. 20, 2019

(30) Foreign Application Priority Data

Dec. 20, 2017 (JP) .................. 2017-244507
Dec. 20, 2017 (JP) .................. 2017-244509

(51) Int. Cl.
*F02D 9/04* (2006.01)
*F01P 3/02* (2006.01)
(Continued)

(52) U.S. Cl.
CPC ............. *F02D 9/04* (2013.01); *F01N 3/2033* (2013.01); *F01N 9/00* (2013.01); *F01N 11/005* (2013.01);
(Continued)

(58) Field of Classification Search
CPC .......... F02D 9/04; F02M 26/73; F02M 26/28; F01N 9/00; F01N 3/2033; F01N 11/005;
(Continued)

(56) References Cited

U.S. PATENT DOCUMENTS

2005/0103014 A1* 5/2005 Sasaki ................... F01N 3/0821
60/605.2
2008/0209887 A1* 9/2008 Hanari .................... F02B 37/22
60/277

(Continued)

FOREIGN PATENT DOCUMENTS

DE 102006034176 A1 11/2007
DE 102015113485 A1 9/2016
(Continued)

OTHER PUBLICATIONS

Extended European Search Report dated Jan. 23, 2019 in EP Application No. 18205070.8.

*Primary Examiner* — Hoang M Nguyen
(74) *Attorney, Agent, or Firm* — Panitch Schwarze Belisario & Nadel LLP

(57) ABSTRACT

An engine promoting activation of a catalyst is provided, including an exhaust manifold, an exhaust lead-out path led out from a manifold exit of the exhaust manifold, a catalyst case provided on the exhaust lead-out path, and a catalyst housed in the catalyst case. The exhaust manifold and the catalyst case are extended in the front-back direction of crankshaft extension and disposed side by side orthogonally to the front-back direction. The engine may further include a supercharger attached to the exit of the exhaust manifold, and the catalyst case is attached to a turbine exit of the supercharger. The engine may further include an exhaust relay pipe attached to the exit of the exhaust manifold, and the catalyst case is attached to a relay pipe exit of the exhaust relay pipe. The engine may further include an exhaust throttle device provided on an exhaust downstream side of the catalyst.

17 Claims, 5 Drawing Sheets

(51) Int. Cl.

| | |
|---|---|
| *F02B 37/02* | (2006.01) |
| *F01N 3/20* | (2006.01) |
| *F01N 11/00* | (2006.01) |
| *F02M 26/28* | (2016.01) |
| *F01P 3/20* | (2006.01) |
| *F02M 26/73* | (2016.01) |
| *F01N 9/00* | (2006.01) |

(52) U.S. Cl.
 CPC .................. *F01P 3/02* (2013.01); *F01P 3/20* (2013.01); *F02B 37/02* (2013.01); *F02M 26/28* (2016.02); *F02M 26/73* (2016.02); F01N 2240/36 (2013.01); F01N 2260/024 (2013.01); F01N 2340/02 (2013.01); F01N 2560/06 (2013.01); F01N 2590/08 (2013.01); F01N 2900/1404 (2013.01); F01N 2900/1602 (2013.01); F01P 2003/028 (2013.01); F01P 2060/00 (2013.01); F01P 2060/16 (2013.01)

(58) Field of Classification Search
 CPC ............. F01N 2590/08; F01N 2560/06; F01N 2900/1602; F01N 2900/1404; F01N 2240/36; F01N 2340/02; F01N 2260/024; F01P 3/02; F01P 3/20; F01P 2060/16; F01P 2060/00; F01P 2003/028; F02B 37/02
 USPC ................................................. 60/605.1–612
 See application file for complete search history.

(56) References Cited

U.S. PATENT DOCUMENTS

2009/0158710 A1* 6/2009 Suzuki ................. F02M 26/15
 60/285
2014/0196454 A1* 7/2014 Ulrey ....................... F01N 3/10
 60/605.2

FOREIGN PATENT DOCUMENTS

| EP | 2581571 A1 | 4/2013 |
|---|---|---|
| JP | H10317995 A | 12/1998 |
| JP | 2010-185340 A | 8/2010 |
| WO | 2008038083 A2 | 4/2008 |
| WO | 2009142989 A2 | 11/2009 |
| WO | 2013132589 A1 | 9/2013 |

* cited by examiner

ENGINE

CROSS-REFERENCE TO RELATED APPLICATION

This application claims priority under 35 U.S.C. § 119(b) to Japanese Patent Application No. 2017-244507, filed Dec. 20, 2017, and Japanese Patent Application No. 2017-244509, filed Dec. 20, 2017, the disclosures of each of which are incorporated herein by reference in their entirety.

BACKGROUND OF THE INVENTION

(1) Field of the Invention

The present invention relates to an engine.

(2) Description of Related Art

In a conventional engine, sometimes the temperature of exhaust flowing out of a manifold exit decreases before the exhaust reaches a catalyst, and the catalyst is unlikely to activate.

SUMMARY OF THE INVENTION

The present invention is intended to provide an engine in which activation of a catalyst is promoted.

In the present invention, when a front-back direction is defined to be a direction in which a crankshaft is extended, an exhaust manifold and a catalyst case are both extended in the front-back direction and disposed side by side in a direction orthogonal to the front-back direction.

The catalyst case is preferably attached to a turbine exit of a supercharger.

The catalyst case may be attached to a relay pipe exit of an exhaust relay pipe.

According to the present invention, activation of a catalyst is promoted.

Further, the activation temperature of the catalyst is likely to be maintained.

BRIEF DESCRIPTION OF THE DRAWINGS

FIGS. 1A, 1B, and 1C are pattern diagrams for describing an exhaust device of an engine according to a first embodiment of the present invention, in which FIG. 1A illustrates a basic example, FIG. 1B illustrates a modification in which a catalyst case is attached in a different structure, and FIG. 1C illustrates a modification in which an exhaust temperature sensor is differently disposed;

DETAILED DESCRIPTION OF PREFERRED EMBODIMENTS

Figure 3:
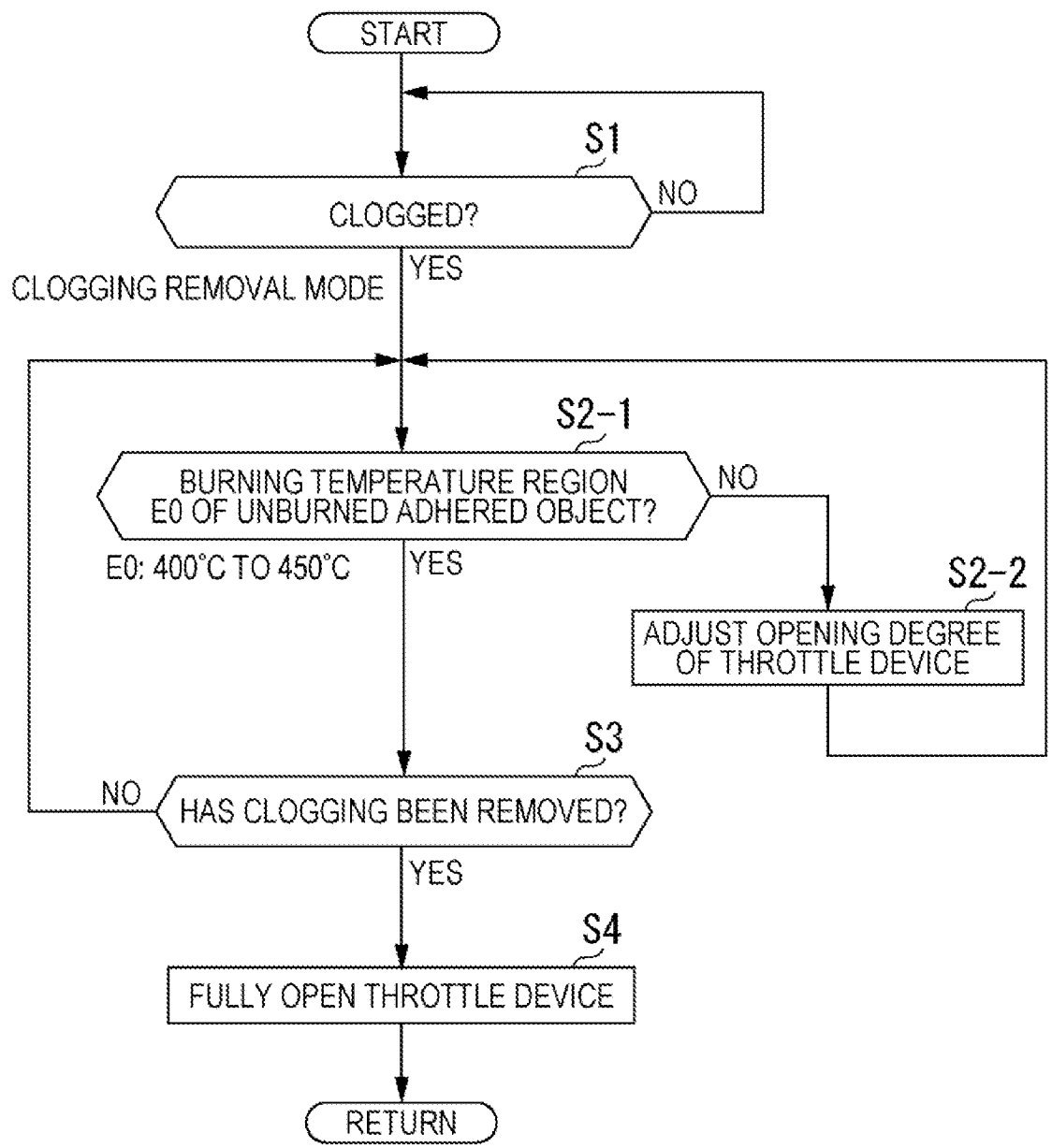
FIG. 3 is a flowchart for describing control of a clogging removal mode of the engine illustrated in FIGS. 1A, 1B, and 1C.
Figure 4:
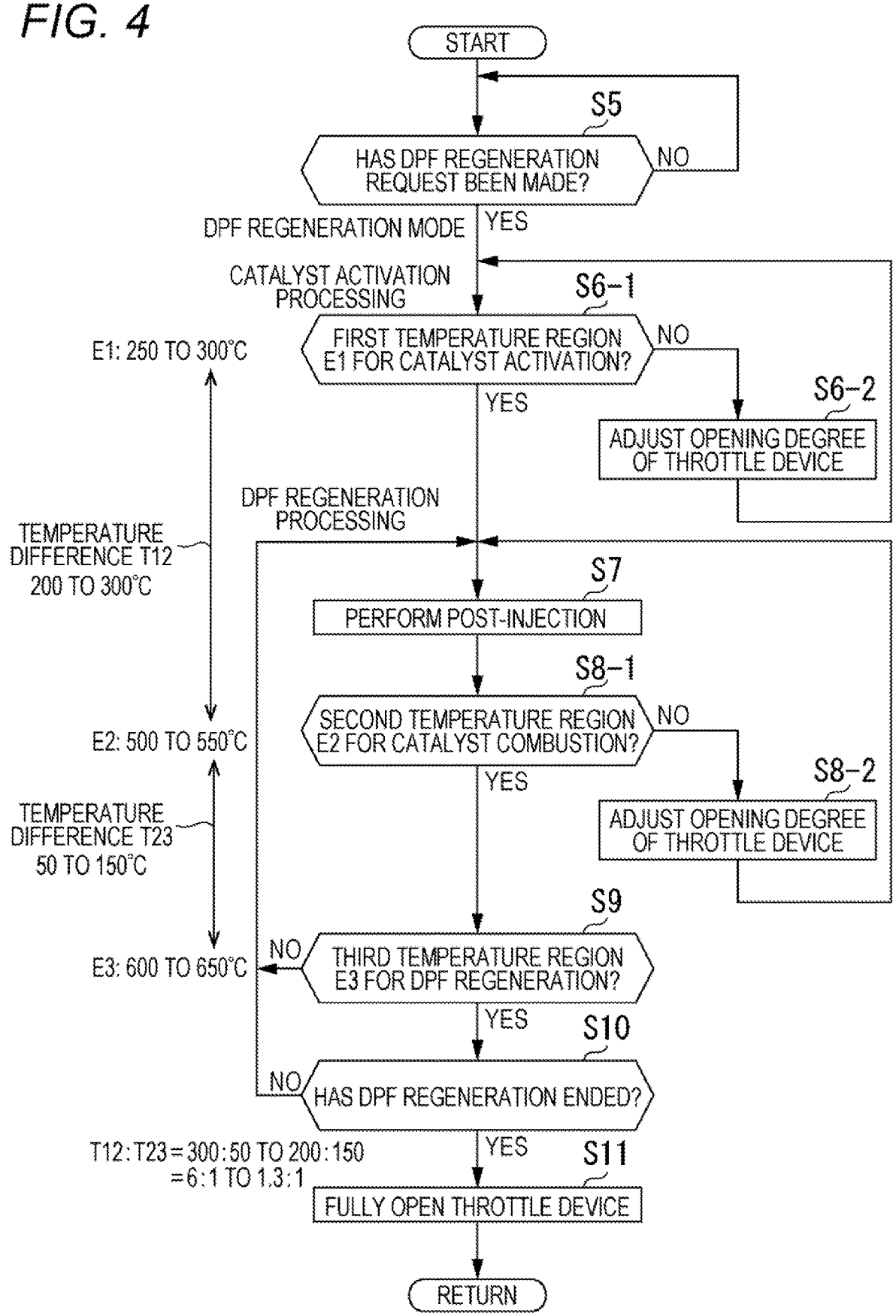
FIG. 4 is a flowchart for describing control of a DPF regeneration mode of the engine illustrated in FIGS. 1A, 1B, and 1C.
Figure 5:
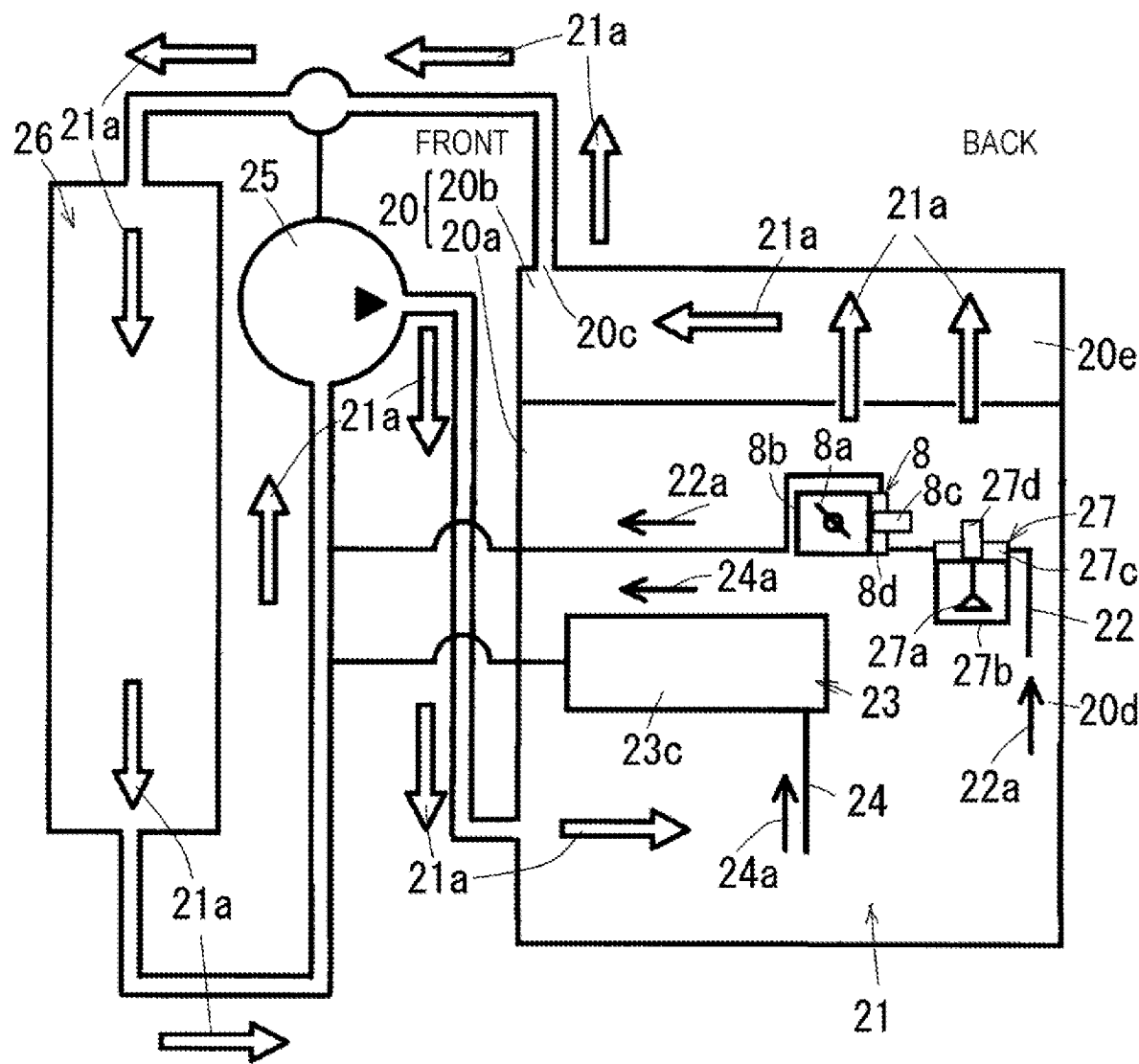
FIG. 5 is a pattern diagram for describing a water cooling device of an engine according to a second embodiment of the present invention.

FIGS. 1A to 4 are diagrams for describing an engine according to a first embodiment of the present invention, and FIG. 5 is a diagram for describing an engine according to a second embodiment of the present invention.

Each embodiment employs a vertical type water-cooled serial multicylinder diesel engine.

The following describes the engine according to the first embodiment of the present invention.

Figure 1A:
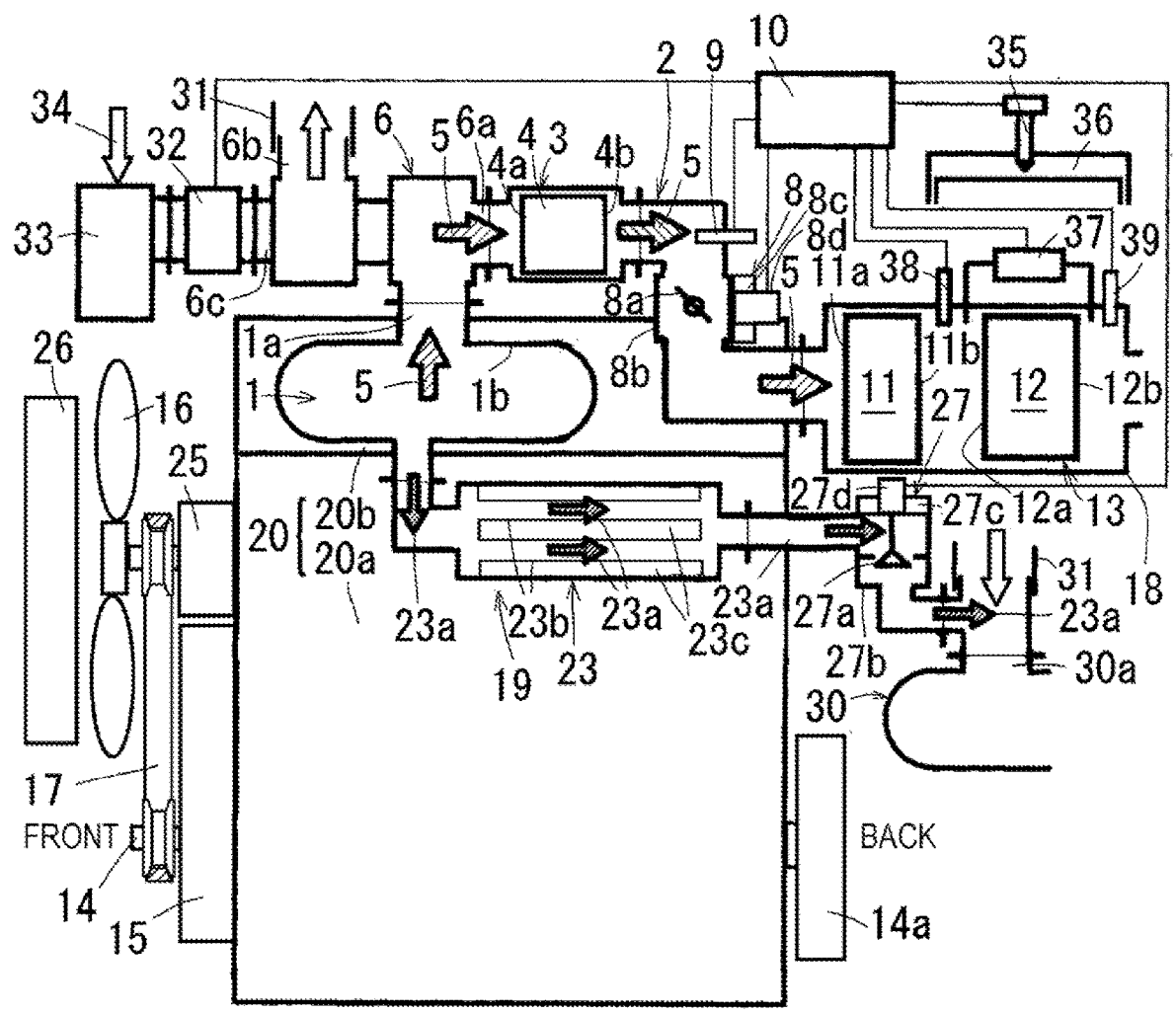

As illustrated in FIG. 1A, the engine includes a cylinder block (20a), and a cylinder head (20b) attached above the cylinder block (20a). When a front-back direction is defined to be a direction in which a crankshaft (14) is extended, a front side is defined to be one side in the front-back direction, and a back side is defined to be the other side, a cooling water pump (25) and a timing transmission case (15) are assembled on the front side of the cylinder block (20a). An engine cooling fan (16) is attached to a pump input shaft of the cooling water pump (25), and the cooling water pump (25) and the engine cooling fan (16) are driven by the crankshaft (14) through a fan belt (17). A radiator (26) is disposed on the front side of the engine cooling fan (16). A flywheel (14a) attached to a back end part of the crankshaft (14) is disposed on the back side of the cylinder block (20a).

As illustrated in FIG. 1A, when a lateral direction is defined to be the width direction of the engine, an exhaust manifold (1) is assembled on one side of the cylinder head (20b) in the lateral direction, and an exhaust lead-out path (2) is led out from a manifold exit (1a) of the exhaust manifold (1). The exhaust lead-out path (2) includes a supercharger (6), a catalyst case (3), an exhaust throttle device (8), and an exhaust cleaning case (18), which are disposed sequentially from an exhaust upstream side. Exhaust (5) flowing out of the manifold exit (1a) of the exhaust manifold (1) sequentially passes through a turbine of the supercharger (6), the catalyst case (3), the exhaust throttle device (8), and the exhaust cleaning case (18), and then is discharged.

As illustrated in FIG. 1A, an intake manifold (30) is assembled on the other side of the cylinder head (20b) in the lateral direction, and a manifold inlet (30a) of the intake manifold (30) is connected with a compressor exit (6b) of the supercharger (6) through a supercharge pipe (31). A compressor inlet (6c) is connected with an air cleaner (33) through an air flow sensor case (32). Air (34) is supercharged to the intake manifold (30) sequentially through the air cleaner (33), a compressor of the supercharger (6), the supercharge pipe (31), and the manifold inlet (30a).

As illustrated in FIG. 1A, an EGR gas derive path (19) is led out from the exhaust manifold (1) and provided with an EGR cooler (23) and an EGR valve device (27) sequentially from the lead-out upstream side, and has a lead-out end connected with the manifold inlet (30a) of the intake manifold (30). Part of the exhaust (5) separated from the exhaust of the exhaust manifold (1) is supplied as EGR gas (23a) to the intake manifold (30) sequentially through the EGR cooler (23) and the EGR valve device (27).

The engine includes a fuel injection valve (35) of a common-rail fuel injection device, and a control device (10) configured to control opening of the fuel injection valve (35). The control device (10) sets the timing and amount of fuel injection through the fuel injection valve (35) based on a target engine rotation speed, an actual engine rotation speed, an engine load, an intake volume, and an intake temperature, each detected by a predetermined sensor.

The control device (10) is achieved by an engine ECU. "ECU" abbreviates an electronic control unit, and is a microcomputer.

Figure 1B:
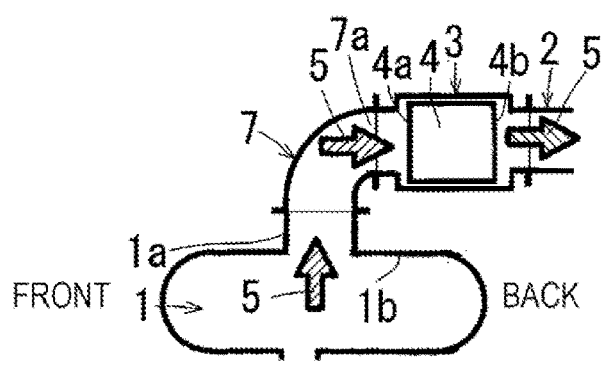

As illustrated in FIGS. 1A and 1B, the engine includes the exhaust manifold (1), the exhaust lead-out path (2) led out from the manifold exit (1a) of the exhaust manifold (1), the catalyst case (3) provided on the exhaust lead-out path (2), and a catalyst (4) housed in the catalyst case (3).

When the front-back direction is defined to be a direction in which the crankshaft (14) is extended, the exhaust manifold (1) and the catalyst case (3) are both extended in the front-back direction and disposed side by side in a direction orthogonal to the front-back direction.

This engine has the following advantage.

The catalyst case (3) is disposed at a position close to the manifold exit (1a) of the exhaust manifold (1), and thus the temperature of exhaust (5) flowing out of the manifold exit (1a) is unlikely to decrease before the exhaust (5) reaches the catalyst (4), which promotes activation of the catalyst (4).

Heat release from the catalyst case (3) is reduced by radiation heat from a wall (1b) of the exhaust manifold (1), and thus the temperature of the catalyst (4) is unlikely to decrease, and the activation temperature of the catalyst (4) is likely to be maintained.

The exhaust manifold (1) and the catalyst case (3) are vertically disposed. The catalyst case (3) is disposed at the upper side, and the exhaust manifold (1) is disposed at the lower side.

The catalyst case (3) is made of metal and disposed above and along the upper wall (1b) of the exhaust manifold (1).

The catalyst case (3) may be disposed on the lower side, and the exhaust manifold (1) may be disposed on the upper side.

The exhaust manifold (1) and the catalyst case (3) may be laterally arranged side by side at the same height, or may be laterally arranged side by side at different heights.

The catalyst (4) on the exhaust upstream side of the exhaust throttle device (8) is a catalyst that cleans any harmful component in the exhaust (5), catalytically combusts unburned fuel, and is used for exhaust cleaning and exhaust temperature increase.

The catalyst (4) is a DOC. "DOC" abbreviates a diesel oxidation catalyst. The DOC is of a flow-through honeycomb type in which a large number of cells along the axial length direction are arranged side by side in a penetrating manner. In the DOC, an oxidation catalyst component is supported in each cell. In the DOC, HC (hydrocarbon) and CO (carbon monoxide) in the exhaust (5) are oxidized into $H_2O$ (water) and $CO_2$. In the DOC, unburned fuel supplied into the exhaust (5) is catalytically combusted so that the temperature of the exhaust (5) increases and a DPF (12) disposed downstream is regenerated. When a catalyst downstream side catalyst (13) is used in place of the DPF (12), the temperature thereof increases, and activation thereof is achieved.

"DPF" abbreviates a diesel particulate filter, and captures PM included in the exhaust (5). "PM" abbreviates a particulate matter.

The DPF (12) is of a wall-flow honeycomb type in which a large number of cells along the axial length direction are arranged side by side, and an exhaust inlet (12a) of each cell is sealed with an exhaust exit (12b) of an adjacent cell.

The catalyst (4) on the exhaust upstream side of the exhaust throttle device (8) may be an SCR catalyst or an $NO_x$ occlusion reduction catalyst.

"SCR catalyst" abbreviates a selective catalytic reduction catalyst. The SCR catalyst is of a flow-through honeycomb type in which a large number of cells along the axial length direction are arranged side by side in a penetrating manner. A urea water injector is disposed on the exhaust upstream side of the SCR catalyst, and injects urea water into the exhaust to obtain ammonia gas under high temperature. The ammonia reduces $NO_x$ (nitrogen oxide), thereby obtaining $N_2$ (nitrogen gas) and $H_2O$ (steam).

The $NO_x$ occlusion reduction catalyst temporarily occludes $NO_x$ in the exhaust and reduces $NO_x$ (into $N_2$).

As illustrated in FIG. 1A, the engine includes the supercharger (6) attached to the manifold exit (1a) of the exhaust manifold (1), and the catalyst case (3) is attached to a turbine exit (6a) of the supercharger (6).

This engine has the following advantage.

The catalyst case (3) is disposed at a position close to the manifold exit (1a) of the exhaust manifold (1), which is likely to promote activation of the catalyst (4).

As illustrated in FIG. 1B, attachment of the catalyst case (3) may be modified as follows.

Specifically, the engine may include an exhaust relay pipe (7) attached to the manifold exit (1a) of the exhaust manifold (1), and the catalyst case (3) may be attached to a relay pipe exit (7a) of the exhaust relay pipe (7).

In this case, the engine has the following advantage, which is same as that described above.

Specifically, the catalyst case (3) is disposed at a position close to the manifold exit (1a) of the exhaust manifold (1), which promotes activation of the catalyst (4).

The exhaust relay pipe (7) is an elbow pipe.

As illustrated in FIG. 1A, the engine includes the exhaust throttle device (8) provided on an exhaust downstream side of the catalyst (4).

This engine has the following advantage.

Increase of back pressure due to throttle of the exhaust throttle device (8) increases the temperature of the exhaust (5) and the temperature of the catalyst (4), which promotes burning of any unburned object adhered to an exhaust inlet (4a) of the catalyst (4) and activation of the catalyst (4).

The unburned object adhered to the exhaust inlet (4a) of the catalyst (4) is a composite of unburned fuel of main injection fuel and PM, and is likely to accumulate at the catalyst (4) when the engine load is small and the exhaust temperature is low, and clog the exhaust inlet (4a) of the catalyst (4).

As illustrated in FIG. 1A, the engine further includes: an exhaust temperature sensor (9) disposed between the catalyst (4) and the exhaust throttle device (8); and the control device (10) configured to control the exhaust temperature sensor (9) and the exhaust throttle device (8) to cooperate with each other. The control device (10) adjusts the opening degree of the exhaust throttle device (8) based on the temperature of the exhaust (5) detected by the exhaust temperature sensor (9).

In this case, this engine has the following advantage.

Increase of the temperature of the exhaust (5) upstream of the exhaust throttle device (8) can be immediately detected by the exhaust temperature sensor (9) configured to directly detect the temperature of the exhaust (5) upstream of the exhaust throttle device (8). Thus, delay in control of the opening degree of the exhaust throttle device (8) is unlikely to occur, and hence the temperature of the exhaust (5) does not increase too much, which leads to reduction of thermal degradation of the exhaust throttle device (8).

Figure 1C:
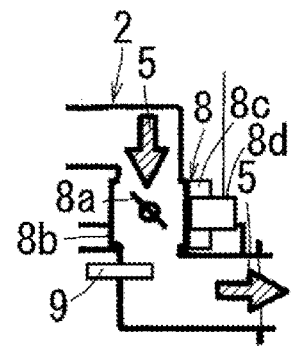

As illustrated in FIG. 1C, the engine may further include: the exhaust temperature sensor (9) disposed at a position on the exhaust downstream side of the exhaust throttle device (8) and close to the exhaust throttle device (8); and the control device (10) configured to control the exhaust temperature sensor (9) and the exhaust throttle device (8) to cooperate with each other. The control device (10) may adjust the opening degree of the exhaust throttle device (8)

based on the temperature of the exhaust (5) detected by the exhaust temperature sensor (9).

In this case, this engine has the following advantage.

Increase of the temperature of the exhaust (5) upstream of the exhaust throttle device (8) can be immediately detected by the exhaust temperature sensor (9) configured to detect the temperature of the exhaust (5) at a position close to the exhaust throttle device (8) on the exhaust downstream side of the exhaust throttle device (8). Thus, delay in control of the opening degree of the exhaust throttle device (8) is unlikely to occur, and hence the temperature of the exhaust (5) does not increase too much, which leads to reduction of thermal degradation of the exhaust throttle device (8).

The separation distance between the exhaust throttle device (8) and the exhaust temperature sensor (9) is sufficiently shorter than the separation distance between the exhaust throttle device (8) and the throttle downstream side catalyst (11). The former is preferably less than half of the latter, more preferably less than one-third of the latter.

As illustrated in FIG. 1A, the engine further includes the throttle downstream side catalyst (11) disposed downstream of the exhaust throttle device (8). The control device (10) estimates the temperature of the exhaust (5) on an exhaust inlet (11a) side of the throttle downstream side catalyst (11) of the exhaust throttle device (8) based on the temperature of the exhaust (5) detected by the exhaust temperature sensor (9), and controls exhaust processing using the throttle downstream side catalyst (11) based on the estimated temperature of the exhaust (5).

This engine has the following advantage.

The exhaust temperature sensor (9) used to control the exhaust throttle device (8) is also used to control the exhaust processing using the throttle downstream side catalyst (11), which leads to reduction of the number of exhaust temperature sensors.

The throttle downstream side catalyst (11) may be same as the throttle upstream side catalyst (4). The throttle downstream side catalyst (11) is a DOC that is same as the throttle upstream side catalyst (4).

As illustrated in FIG. 1A, the exhaust processing using the throttle downstream side catalyst (11) involves exhaust temperature increasing processing of catalytically combusting unburned fuel supplied into the exhaust (5) with the throttle downstream side catalyst (11).

This engine has the following advantage.

When the DPF (12) is disposed downstream of the throttle downstream side catalyst (11), the DPF (12) can be regenerated through the exhaust temperature increasing processing.

When, in place of the DPF (12), the catalyst downstream side catalyst (13) is disposed downstream of the throttle downstream side catalyst (11), the catalyst downstream side catalyst (13) can be activated through the exhaust temperature increasing processing.

The throttle downstream side catalyst (11) and the DPF (12) are housed in the exhaust cleaning case (18). The throttle downstream side catalyst (11) is disposed on the exhaust upstream side, and the DPF (12) is disposed on the exhaust downstream side.

When the catalyst downstream side catalyst (13) is used in place of the DPF (12), the catalyst downstream side catalyst (13) is disposed on the exhaust downstream side of the throttle downstream side catalyst (11).

The throttle downstream side catalyst (11) may be same as the throttle upstream side catalyst (4). The throttle downstream side catalyst (11) is preferably a DOC that is same as the throttle upstream side catalyst (4).

The catalyst downstream side catalyst (13) may be an SCR catalyst, an $NO_x$ occlusion reduction catalyst, or the like in place of the DOC.

When the throttle downstream side catalyst (11) is an SCR catalyst, the catalyst downstream side catalyst (13) is preferably a DOC to clean ammonia passing through the SCR catalyst.

A water cooling device has the following configuration.

Figure 2:
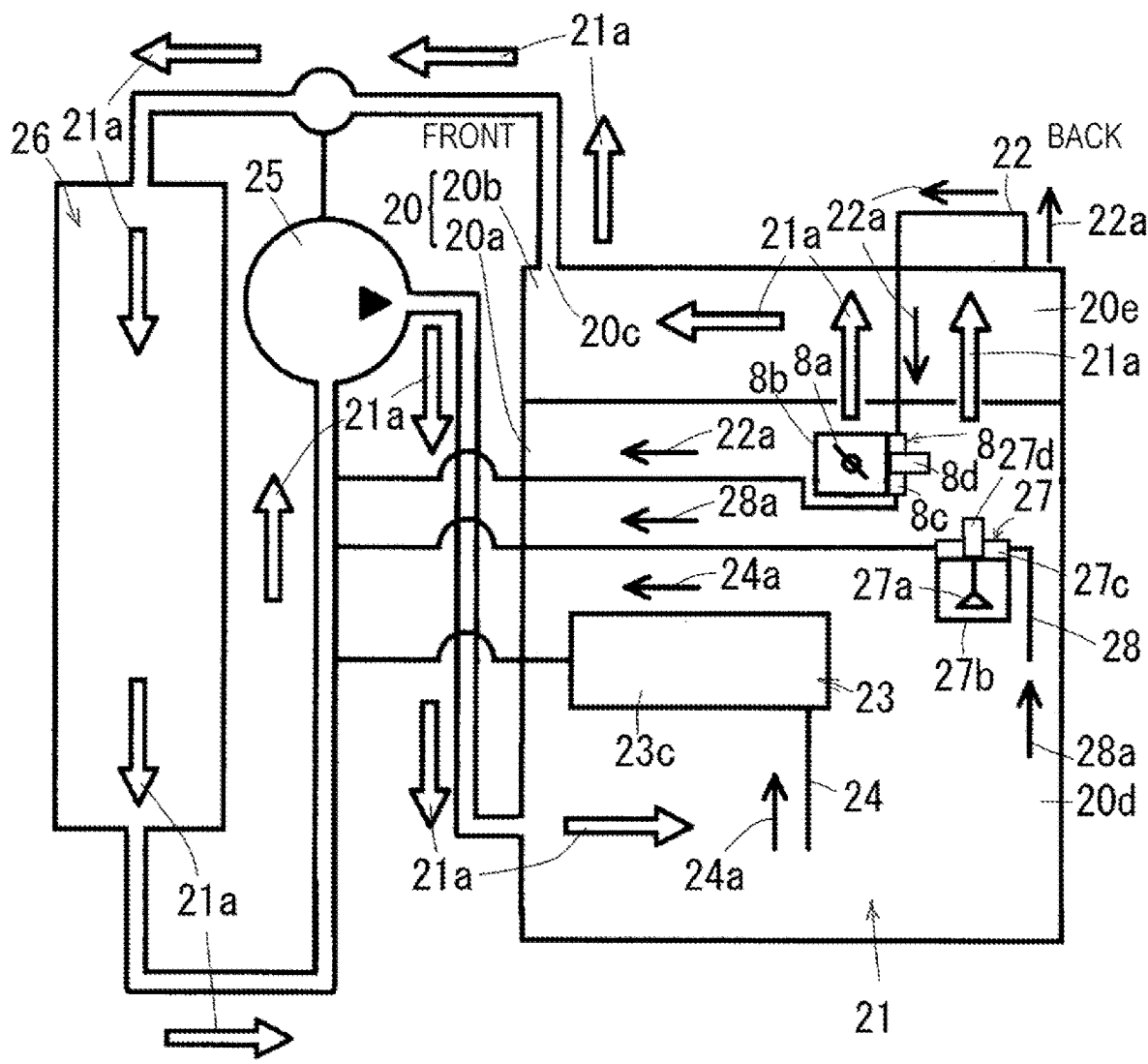
FIG. 2 is a pattern diagram for describing a water cooling device of the engine illustrated in FIGS. 1A, 1B, and 1C.

As illustrated in FIG. 2, the engine further includes: a main water path (21) in which an engine body (20) is water-cooled; and a bypass water path (22) bifurcated from the main water path (21). The bypass water path (22) is connected with the exhaust throttle device (8).

This engine has the following advantage.

The exhaust throttle device (8) heated by the exhaust (5) is water-cooled, and the temperature of the exhaust throttle device (8) decreases accordingly, which leads to reduction of thermal degradation of the exhaust throttle device (8).

The exhaust throttle device (8) includes an exhaust throttle valve (8a), a valve case (8b), a water jacket (8c) along the valve case (8b), and a valve drive actuator (8d) penetrating through the water jacket (8c). Bypass cooling water (22a) to the exhaust throttle device (8) passes through the water jacket (8c) and water-cools the valve case (8b) and the valve drive actuator (8d).

As illustrated in FIG. 2, the engine further includes: the EGR cooler (23); and a pair of bypass water paths (22) and (24) individually bifurcated from the main water path (21) in which the engine body (20) is water-cooled. The pair of bypass water paths (22) and (24) are individually connected with the exhaust throttle device (8) and the EGR cooler (23), respectively.

This engine has the following advantage.

The pair of bypass water paths (22) and (24) individually connected with the exhaust throttle device (8) and the EGR cooler (23), respectively, have small water path resistances, a large amount of bypass cooling water (22a) is supplied to the exhaust throttle device (8), and thus the temperature of the exhaust throttle device (8) decreases, which leads to reduction of thermal degradation of the exhaust throttle device (8).

Since the pair of bypass water paths (22) and (24) have small water path resistances, a large amount of bypass cooling water (24a) is supplied to the EGR cooler (23), and thus the temperature of the EGR gas (23a) decreases and the density of the EGR gas (23a) increases, which leads to an increased EGR ratio.

The EGR cooler (23) includes a plurality of heat release pipes (23b) through which the EGR gas (23a) passes, and a water jacket (23c) surrounding the heat release pipes (23b) side by side. The EGR gas (23a) is water-cooled by the bypass cooling water (24a) passing through the water jacket (23c).

As illustrated in FIG. 2, the main water path (21) has a configuration in which main cooling water (21a) is driven by the cooling water pump (25) to sequentially circulate through a water jacket (20d) of the cylinder block (20a), a water jacket (20e) of the cylinder head (20b), and the radiator (26).

The bypass water path (24) connected with the EGR cooler (23) is bifurcated from the water jacket (20d) of the cylinder block (20a).

This engine has the following advantage.

The bypass cooling water (24a) separated from the main cooling water (21a) at relatively low temperature yet to be heated to high temperature at the cylinder head (20b) is supplied to the EGR cooler (23), which leads to increase of cooling performance of the EGR cooler (23).

The bypass water path (22) connected with the exhaust throttle device (8) is bifurcated from the water jacket (20e) of the cylinder head (20b).

This engine has the following advantage.

The bypass cooling water (22a) at appropriate temperature having absorbed heat from the cylinder block (20a) and the cylinder head (20b) is supplied to the exhaust throttle device (8) at high temperature, thereby preventing actuation defect of the exhaust throttle device (8) due to overcooling.

As illustrated in FIG. 2, when the front-back direction is defined to be the direction in which the crankshaft (14) is extended, a front side is defined to be an optional one side in the front-back direction, and a back side is defined to be the other side, the water jacket (20e) of the cylinder head (20b) includes, on the front side, a main cooling water exit (20c) through which the main cooling water (21a) is fed out to the radiator (26), and the bypass water path (22) connected with the exhaust throttle device (8) is bifurcated on the back side of the water jacket (20e) of the cylinder head (20b).

This engine has the following advantage.

The bypass cooling water (22a) separated from the main cooling water (21a) at relatively low temperature before reaching the main cooling water exit (20c) is supplied to the exhaust throttle device (8), which leads to increase of cooling performance of the exhaust throttle device (8).

As illustrated in FIG. 2, the engine further includes the EGR valve device (27), and the EGR valve device (27) is connected with a bypass water path (28) bifurcated from the main water path (21) other than the pair of bypass water paths (22) and (24).

This engine has the following advantage.

The bypass water path (28) not connected with the EGR cooler (23) and the exhaust throttle device (8) has a small water path resistance, a large amount of bypass cooling water (28a) is supplied to the EGR valve device (27), and the temperature of the EGR valve device (27) decreases, which leads to reduction of thermal degradation of the EGR valve device (27).

The EGR valve device (27) includes an EGR valve (27a), a valve case (27b), a water jacket (27c) along the valve case (27b), and a valve drive actuator (27d) penetrating through the water jacket (27c). The bypass cooling water (28a) to the EGR valve device (27) passes through the water jacket (27c) and water-cools the valve case (27b) and the valve drive actuator (27d).

As illustrated in FIG. 2, the bypass water path (28) connected with the EGR valve device (27) is bifurcated from the water jacket (20d) of the cylinder block (20a).

This engine has the following advantage.

The bypass cooling water (28a) separated from the main cooling water (21a) at relatively low temperature yet to be heated to high temperature at the cylinder head (20b) is supplied to the EGR valve device (27), which leads to increase of cooling performance of the EGR valve device (27).

The flow of control of the engine is as follows.

In the engine, the following control is performed by the control device (10).

A clogging removal mode illustrated in FIG. 3 is executed when it is determined that the exhaust inlet (4a) of the catalyst (4) is clogged by an unburned adhered object.

A DPF regeneration mode illustrated in FIG. 4 is executed when PM accumulates at the DPF (12) and a DPF regeneration request is made.

When the DPF regeneration request is made during the clogging removal mode, clogging of the exhaust inlet (4a) of the catalyst (4) is removed in the clogging removal mode, and then the DPF regeneration mode is executed.

When the determination of clogging of the catalyst (4) is positive during the DPF regeneration mode, clogging of the exhaust inlet (4a) of the catalyst (4) is removed in the clogging removal mode, and then the DPF regeneration mode is resumed.

As illustrated in FIG. 3, it is determined whether the exhaust inlet (4a) of the catalyst (4) is clogged by an unburned adhered object at step (S1). When the clogging determination at step (S1) is negative, step (S1) is repeated until the determination is positive.

When an accumulated time in which the temperature of the exhaust (5) detected by the exhaust temperature sensor (9) at an exhaust exit (4b) of the catalyst (4) is continuously maintained in a predetermined low-temperature state has not reached a predetermined time, it is estimated that no clogging is present, and the determination at step (S1) is negative. When the accumulated time has reached the predetermined time, it is estimated that clogging is present, and the determination at step (S1) is positive. The pressure difference between the exhaust inlet (4a) and the exhaust exit (4b) of the catalyst (4) may be detected, and the clogging determination may be positive when the pressure difference is equal to or larger than a predetermined pressure, or the clogging determination may be negative when the pressure difference is smaller than the predetermined pressure.

When the determination at step (S1) is positive, the process transitions to step (S2-1).

At step (S2-1), it is determined whether the temperature of the exhaust (5) detected by the exhaust temperature sensor (9) is in a burning temperature region of an unburned object adhered to the exhaust inlet (4a). When the determination is positive, the process transitions to step (S3). When the determination at step (S2-1) is negative, the opening degree of the exhaust throttle device (8) is adjusted at step (S2-2). The burning temperature region is set to be, for example, 400° C. to 450° C. When the detected temperature of the exhaust (5) is lower than this region, the adjustment is performed to reduce the opening degree of the exhaust throttle device (8). When the temperature of the exhaust (5) exceeds the region, the adjustment is performed to increase the opening degree of the exhaust throttle device (8).

At step (S3), it is determined whether the clogging of the catalyst (4) is removed. When the determination at step (S3) is positive, the process transitions to step (S4). When the determination at step (S3) is negative, the process returns to step (S2-1).

At step (S3), when the accumulated time in which the temperature of the exhaust (5) detected by the exhaust temperature sensor (9) is maintained at the burning temperature of the unburned adhered object has reached the predetermined time, it is estimated that the clogging has been removed, and the determination at step (S3) is positive. When the accumulated time has not reached the predetermined time, it is estimated that the clogging has not been removed, and the determination at step (S3) is negative. The pressure difference between the exhaust inlet (4a) and the exhaust exit (4b) of the catalyst (4) may be detected, and the determination at step (S3) may be positive when the pressure difference is smaller than a predetermined pressure, or the determination at step (S3) may be negative when the pressure difference is equal to or larger than the predetermined pressure.

At step (S4), the exhaust throttle device (8) is fully opened, and the process returns to step (S1).

As illustrated in FIG. 4, at step (S5), it is determined whether the DPF regeneration request has been made. When the regeneration request determination is positive, the process transitions to step (S6-1), and the DPF regeneration mode is executed.

The DPF regeneration request is made by the control device (10) when an estimated accumulation value of PM accumulated at the DPF (12) has reached a predetermined value.

The PM estimated accumulation value is calculated by detecting a pressure difference between the exhaust inlet (12a) and the exhaust exit (12b) of the DPF (12). The DPF regeneration is requested when the pressure difference is equal to or larger than a predetermined pressure, but the DPF regeneration is not requested when the pressure difference is smaller than the predetermined pressure.

In the DPF regeneration mode illustrated in FIG. 4, a target exhaust temperature of the exhaust (5) detected by the exhaust temperature sensor (9) is set to be in a catalyst activation temperature region appropriate for activation of the catalyst (4) and the throttle downstream side catalyst (11).

At step (S6-1) illustrated in FIG. 4, it is determined whether the temperature of the exhaust (5) detected by the exhaust temperature sensor (9) is in the catalyst activation temperature region. When the determination at step (S6-1) is positive, the process transitions to step (S7). When the determination at step (S6-1) is negative, the opening degree of the exhaust throttle device (8) is adjusted at step (S6-2), and the process returns to step (S6-1).

The catalyst activation temperature region is set to be, for example, 250° C. to 300° C. When the temperature of the exhaust (5) detected by the exhaust temperature sensor (9) is lower than this region, the opening degree of the exhaust throttle device (8) is adjusted to decrease. When the temperature of the exhaust (5) exceeds the region, the opening degree of the exhaust throttle device (8) is adjusted to increase. In this manner, the temperature of the exhaust (5) is adjusted to be in the catalyst activation temperature region as the target exhaust temperature.

After the temperature of the exhaust (5) has reached the catalyst activation temperature region as the target exhaust temperature, the control device (10) sets the target exhaust temperature of the exhaust (5) detected by the exhaust temperature sensor (9) to be in a DPF regeneration temperature region appropriate for a regeneration temperature of the DPF (12). The DPF regeneration temperature region is set to be higher than the catalyst activation temperature region, and, for example, 500° C. to 550° C.

Accordingly, the temperature at the exhaust inlet (12a) of the DPF (12) is adjusted to 600° C. to 650° C., which is appropriate for regeneration of the DPF (12).

At step (S7), post-injection is performed, and the process transitions to step (S8-1).

The post-injection is fuel injection into a combustion room (36) performed at expansion stroke or exhaust stroke after main injection from the fuel injection valve (35) in a combustion cycle.

Unburned fuel supplied into the exhaust (5) by the post-injection is catalytically combusted with the catalyst (4) and the throttle downstream side catalyst (11), and the temperature of the exhaust (5) increases. Accordingly, the PM accumulated at the DPF (12) is burned and removed, and the DPF (12) is regenerated.

The timing and amount of the post-injection from the fuel injection valve (35) are set and controlled by the control device (10) based on the intake volume detected at the air flow sensor case (32), the back pressure detected by a back pressure sensor (40) between the catalyst (4) and the exhaust throttle device (8), the temperature of the exhaust (5) detected by the exhaust temperature sensor (9), the temperature of the exhaust (5) detected by an exhaust temperature sensor (38) at the exhaust inlet (12a) of the DPF (12), and the like.

Supply of unburned fuel to the exhaust (5) may be performed by exhaust pipe injection in which fuel is injected into the exhaust lead-out path (2) through a fuel injection nozzle, instead of the post-injection.

At step (S8-1), it is determined whether the temperature of the exhaust (5) detected by the exhaust temperature sensor (9) is in a catalytic combustion temperature region. When the determination at step (S8-1) is positive, the process transitions to step (S9). When the determination at step (S8-1) is negative, the opening degree of the exhaust throttle device (8) is adjusted at step (S8-2), and the process returns to step (S7). When the temperature of the exhaust (5) detected by the exhaust temperature sensor (9) is lower than the catalytic combustion temperature region, the opening degree of the exhaust throttle device (8) is adjusted to decrease. When the temperature of the exhaust (5) exceeds the region, the opening degree of the exhaust throttle device (8) is adjusted to increase. In this manner, the detected temperature of the exhaust (5) is set to be in the catalytic combustion temperature region as the target exhaust temperature.

At step (S9), it is determined whether the temperature of the exhaust (5) detected by the exhaust temperature sensor (38) at the exhaust inlet (12a) of the DPF (12) is in the DPF regeneration temperature region. When the determination at step (S9) is negative, the process transitions to step (S10). When the determination at step (S9) is positive, the process returns to step (S7).

At step (S10), it is determined whether the DPF regeneration has ended. When the determination is positive, the exhaust throttle device (8) is fully opened at step (S11), and the process returns to step (S5). When the determination at step (S10) is negative, the process returns to step (S7).

When an accumulated time in which the temperature of the exhaust (5) detected by the exhaust temperature sensor (38) at the exhaust inlet (12a) of the DPF (12) is maintained in the DPF regeneration temperature region has reached a predetermined time, the determination at step (S10) is positive. When the accumulated time has not reached the predetermined time, the determination at step (S10) is negative. The DPF regeneration temperature region is set to be, for example, 600° C. to 650° C. The pressure difference between the exhaust inlet (12a) and the exhaust exit (12b) of the DPF (12) may be detected by a pressure difference sensor (37), and the determination at step (S10) may be positive when the pressure difference is smaller than the predetermined pressure, or the determination at step (S10) may be negative when the pressure difference is equal to or larger than the predetermined pressure. When the temperature of the exhaust (5) detected by an exhaust temperature sensor (39) on the exhaust exit (12b) side of the DPF (12) has reached an anomalous temperature exceeding a predetermined upper limit temperature, the DPF regeneration is put to an emergency stop. The upper limit temperature is set to be, for example, 700° C.

A main configuration and advantage related to the DPF regeneration are as follows.

As illustrated in FIGS. 1A to 1C, the configuration includes the catalyst (4), the exhaust temperature sensor (9), and the exhaust throttle device (8), which are disposed on the exhaust upstream side of the DPF (12), and the control device (10) configured to control the exhaust temperature sensor (9) and the exhaust throttle device (8) to cooperate with each other.

As illustrated in FIGS. 1A to 1C and 4, catalyst activation processing and then DPF regeneration processing are performed under control of the control device (10). In the catalyst activation processing, the target temperature of the exhaust (5) at the exhaust exit (4b) of the catalyst (4) is set to be in a first temperature region (E1), and the opening degree of the exhaust throttle device (8) is controlled. In the DPF regeneration processing, the target temperature is set to be in a second temperature region (E2), the target temperature of the exhaust (5) at the exhaust inlet (12a) of the DPF (12) is set to be in a third temperature region (E3), the opening degree of the exhaust throttle device (8) is controlled, and unburned fuel is supplied into the exhaust (5).

As illustrated in FIG. 4, the second temperature region (E2) is set to be higher than the first temperature region (E1), the third temperature region (E3) is set to be higher than the second temperature region (E2), and a temperature difference (T12) between the first temperature region (E1) and the second temperature region (E2) is set to be larger than a temperature difference (T23) between the second temperature region (E2) and the third temperature region (E3).

This engine has the following advantage.

At transition from the catalyst activation processing to the DPF regeneration processing, the exhaust throttle device (8) is gradually opened when the temperature of the exhaust (5) is increased through catalytic combustion of unburned fuel in the DPF regeneration processing in which the target temperature is the high second temperature region (E2). Accordingly, a contingent situation due to abrupt opening of the exhaust throttle device (8), in other words, a contingent situation in which the temperature of the exhaust (5) abruptly decreases due to abrupt decrease of the back pressure, unburned fuel supply by the post-injection or the like is stopped, and the DPF regeneration is stagnated is unlikely to occur, and thus the DPF regeneration is promoted.

As illustrated in FIG. 4, the temperature difference (T12) between the first temperature region (E1) for catalyst activation and the second temperature region (E2) for catalytic combustion is the range of 200° C. to 300° C., and the temperature difference (T23) between the temperature region (E2) for catalytic combustion and the third temperature region (E3) for DPF regeneration is the range of 50° C. to 150° C.

As illustrated in FIG. 4, the ratio of the temperature differences (T12) and (T23) is 300:50 at maximum and 200:150 at minimum, in other words, 6:1 at maximum and 1.3:1 at minimum.

When the ratio of the temperature differences (T12) and (T23) exceeds 6:1 and the temperature difference (T12) increases, the second temperature region (E2) for catalytic combustion becomes too high, which is likely to cause thermal degradation of the exhaust throttle device (8). When the ratio becomes below 1.3:1 and the temperature difference (T12) decreases, the second temperature region (E2) for catalytic combustion becomes too low, and the exhaust throttle device (8) abruptly opens in the DPF regeneration processing. Accordingly, a contingent situation due to the abrupt opening of the exhaust throttle device (8), in other words, a contingent situation in which the temperature of the exhaust (5) abruptly decreases due to abrupt decrease of the back pressure, unburned fuel supply by the post-injection or the like is stopped, and the DPF regeneration is stagnated is likely to occur, and thus the DPF regeneration is stagnated.

The post-injection is stopped when the temperature of the exhaust (5) becomes lower than the catalyst activation temperature region.

As illustrated in FIGS. 1A to 1C and 3, when the exhaust inlet (4a) of the catalyst (4) is clogged by an unburned adhered object, clogging removal processing is performed under control of the control device (10). In the clogging removal processing, the target temperature of the exhaust (5) at the exhaust inlet (4a) of the catalyst (4) is set to be in the burning temperature region (EO) of the unburned adhered object, and the opening degree of the exhaust throttle device (8) is controlled.

This engine has the following advantage.

The unburned adhered object clogging the exhaust inlet (4a) of the catalyst (4) is burned through the clogging removal processing, and the clogging of the exhaust inlet (4a) of the catalyst (4) is reduced.

The following describes the second embodiment.

An engine according to the second embodiment is different from that of the first embodiment at the following points.

As illustrated in FIG. 5, the exhaust throttle device (8) and the EGR valve device (27) are connected with in series with the bypass water path (22).

This engine has the following advantage.

Since the bypass path (22) is shared, the number of bypass water paths can be reduced.

Since the bypass water path (22) connected with the exhaust throttle device (8) and the EGR valve device (27) is not connected with the EGR cooler (23), the amount of the bypass cooling water (24a) supplied to the EGR cooler (23) is not reduced due to the water path resistances of the exhaust throttle device (8) and the EGR valve device (27). Accordingly, the cooling efficiency of the EGR cooler (23) is maintained high, and the EGR ratio does not decrease.

As illustrated in FIG. 5, the EGR valve device (27) is connected upstream of the bypass water path (22), and the exhaust throttle device (8) is connected downstream of the bypass water path (22).

In the engine, the bypass cooling water (22a) at appropriate temperature having absorbed heat from the EGR valve device (27) is supplied to the exhaust throttle device (8) at high temperature, thereby preventing actuation defect of the exhaust throttle device (8) due to overcooling.

As illustrated in FIG. 1A, the EGR valve device (27) is disposed downstream of the EGR cooler (23) on the flow path of the EGR gas (23a).

In the engine, the EGR gas (23a) at relatively low temperature cooled by the EGR cooler (23) is supplied to the EGR valve device (27), and thus a thermal load on the EGR valve device (27) is small. Accordingly, when the supply amount of the bypass cooling water (22a) has decreased due to the water path resistance of the exhaust throttle device (8) as illustrated in FIG. 5, no problem occurs to cooling of the EGR valve device (27), which leads to reduction of thermal degradation of the EGR valve device (27).

As illustrated in FIG. 5, the main water path (21) has a configuration which the main cooling water (21a) is driven by the cooling water pump (25) to sequentially circulate through a water jacket (20d) of the cylinder block (20a), a water jacket (20e) of the cylinder head (20b), and the radiator (26).

The bypass path (22) is led out from the water jacket (20d) of the cylinder block (20a).

This engine has the following advantage.

The bypass cooling water (22a) separated from the main cooling water (21a) at relatively low temperature yet to be heated to high temperature at the cylinder head (20b) is supplied to the EGR valve device (27) and the exhaust throttle device (8), which leads to increase of cooling performance of the EGR valve device (27) and the exhaust throttle device (8).

As illustrated in FIG. 5, the bypass path (22) connected with the exhaust throttle device (8) is led out from the water jacket (20d) of the cylinder block (20a).

This engine has the following advantage.

The bypass cooling water (22a) separated from the main cooling water (21a) at relatively low temperature yet to be heated to high temperature at the cylinder head (20b) is supplied to the exhaust throttle device (8), which leads to increase of cooling performance of the exhaust throttle device (8).

As illustrated in FIG. 5, the bypass path (22) connected with the EGR valve device (27) is led out from the water jacket (20d) of the cylinder block (20a).

This engine has the following advantage.

The bypass cooling water (22a) separated from the main cooling water (21a) at relatively low temperature yet to be heated to high temperature at the cylinder head (20b) is supplied to the EGR valve device (27), which leads to increase of cooling performance of the EGR valve device (27).

Other configurations and functions are same as those of the engine according to the first embodiment. In FIG. 5, any component identical to that in the first embodiment is denoted by an identical reference sign in FIG. 2 and the like.

What is claimed is:

1. An engine comprising:
    an exhaust manifold;
    an exhaust lead-out path led out from a manifold exit of the exhaust manifold;
    a catalyst case provided on the exhaust lead-out path; and
    a catalyst housed in the catalyst case,
    wherein, when a front-back direction is defined to be a direction in which a crankshaft is extended, the exhaust manifold and the catalyst case are both extended in the front-back direction and disposed side by side in a direction orthogonal to the front-back direction,
    the engine further comprising an exhaust throttle device provided on an exhaust downstream side of the catalyst;
    a main water path in which an engine body is water-cooled; and
    a bypass water path bifurcated from the main water path,
    wherein the bypass water path is connected with the exhaust throttle device,
    the engine further comprising:
    an EGR cooler; and
    a pair of bypass water paths individually bifurcated from the main water path in which the engine body is water-cooled,
    wherein the pair of bypass water paths are individually connected with the exhaust throttle device and the EGR cooler, respectively.

2. The engine according to claim 1, further comprising a supercharger attached to the manifold exit of the exhaust manifold, wherein
    the catalyst case is attached to a turbine exit of the supercharger.

3. The engine according to claim 1, further comprising an exhaust relay pipe attached to the manifold exit of the exhaust manifold, wherein
    the catalyst case is attached to a relay pipe exit of the exhaust relay pipe.

4. The engine according to claim 1, further comprising:
    an exhaust temperature sensor disposed between the catalyst and the exhaust throttle device; and
    a control device configured to control the exhaust temperature sensor and the exhaust throttle device to cooperate with each other,
    wherein the control device adjusts an opening degree of the exhaust throttle device based on a temperature of exhaust detected by the exhaust temperature sensor.

5. The engine according to claim 1, further comprising:
    an exhaust temperature sensor disposed at a position on an exhaust downstream side of the exhaust throttle device and close to the exhaust throttle device; and
    a control device configured to control the exhaust temperature sensor and the exhaust throttle device to cooperate with each other,
    wherein the control device adjusts an opening degree of the exhaust throttle device based on a temperature of exhaust detected by the exhaust temperature sensor.

6. The engine according to claim 4, further comprising an throttle downstream side catalyst disposed downstream of the exhaust throttle device,
    wherein the control device estimates the temperature of the exhaust on an exhaust inlet side of the throttle downstream side catalyst of the exhaust throttle device based on the temperature of the exhaust detected by the exhaust temperature sensor, and controls exhaust processing using the throttle downstream side catalyst based on the estimated temperature of the exhaust.

7. The engine according to claim 6, wherein the exhaust processing using the throttle downstream side catalyst involves exhaust temperature increasing processing of catalytically combusting unburned fuel supplied into the exhaust with the throttle downstream side catalyst.

8. The engine according to claim 1, wherein
    the main water path has a configuration in which main cooling water is driven by a cooling water pump to sequentially circulate through a water jacket of a cylinder block, a water jacket of a cylinder head, and a radiator, and
    the bypass water path connected with the EGR cooler is bifurcated from the water jacket of the cylinder block.

9. The engine according to claim 1, wherein
    the main water path has a configuration in which main cooling water is driven by a cooling water pump to sequentially circulate through a water jacket of a cylinder block, a water jacket of a cylinder head, and a radiator, and
    the bypass water path connected with the exhaust throttle device is bifurcated from the water jacket of the cylinder head.

10. The engine according to claim 9, wherein, when the front-back direction is defined to be the direction in which the crankshaft is extended, a front side is defined to be an optional one side in the front-back direction, and a back side is defined to be another side, the water jacket of the cylinder head includes, on the front side, a main cooling water exit through which the main cooling water is fed out to the radiator, and the bypass water path connected with the exhaust throttle device is bifurcated on the back side of the water jacket of the cylinder head.

11. The engine according to claim 1, further comprising an EGR valve device, wherein the EGR valve device is connected with a bypass water path bifurcated from the main water path other than the pair of bypass water paths.

12. The engine according to claim 11, wherein the bypass water path connected with the EGR valve device is bifurcated from the water jacket of the cylinder block.

13. The engine according to claim 1, wherein the exhaust throttle device and the EGR valve device are connected in series with the bypass water path.

14. The engine according to claim 13, wherein the EGR valve device is connected upstream of the bypass water path, and the exhaust throttle device is connected downstream of the bypass water path.

15. The engine according to claim 13, wherein the EGR valve device is disposed downstream of the EGR cooler on the flow path of EGR gas.

16. The engine according to claim 13, wherein
the main water path has a configuration in which main cooling water is driven by a cooling water pump to sequentially circulate through a water jacket of a cylinder block, a water jacket of a cylinder head, and a radiator, and
the bypass path is led out from the water jacket of the cylinder block.

17. The engine according to claim 1, wherein
the main water path has a configuration in which main cooling water is driven by a cooling water pump to sequentially circulate through a water jacket of a cylinder block, a water jacket of a cylinder head, and a radiator, and
the bypass path connected with the exhaust throttle device is led out from the water jacket of the cylinder block.

* * * * *